No. 798,234. PATENTED AUG. 29, 1905.
W. H. TROUT.
SAWMILL SET WORKS.
APPLICATION FILED DEC. 29, 1904.

6 SHEETS—SHEET 1.

Witnesses:
Geo. W. Young
Chas. L. Goss.

Inventor:
William H. Trout,
By Winkler Flanders Smith Bottum Hanseth
Attorneys.

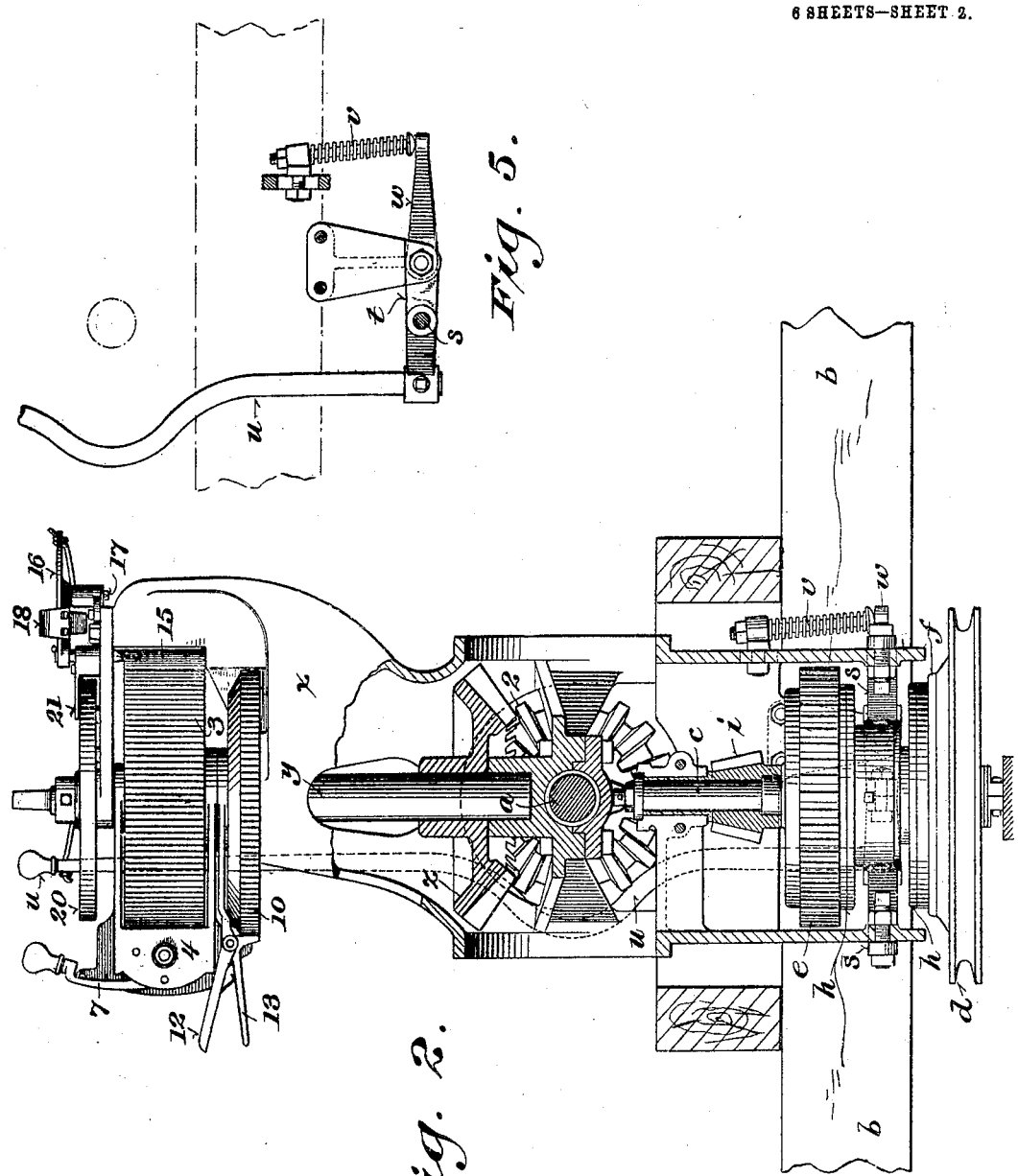

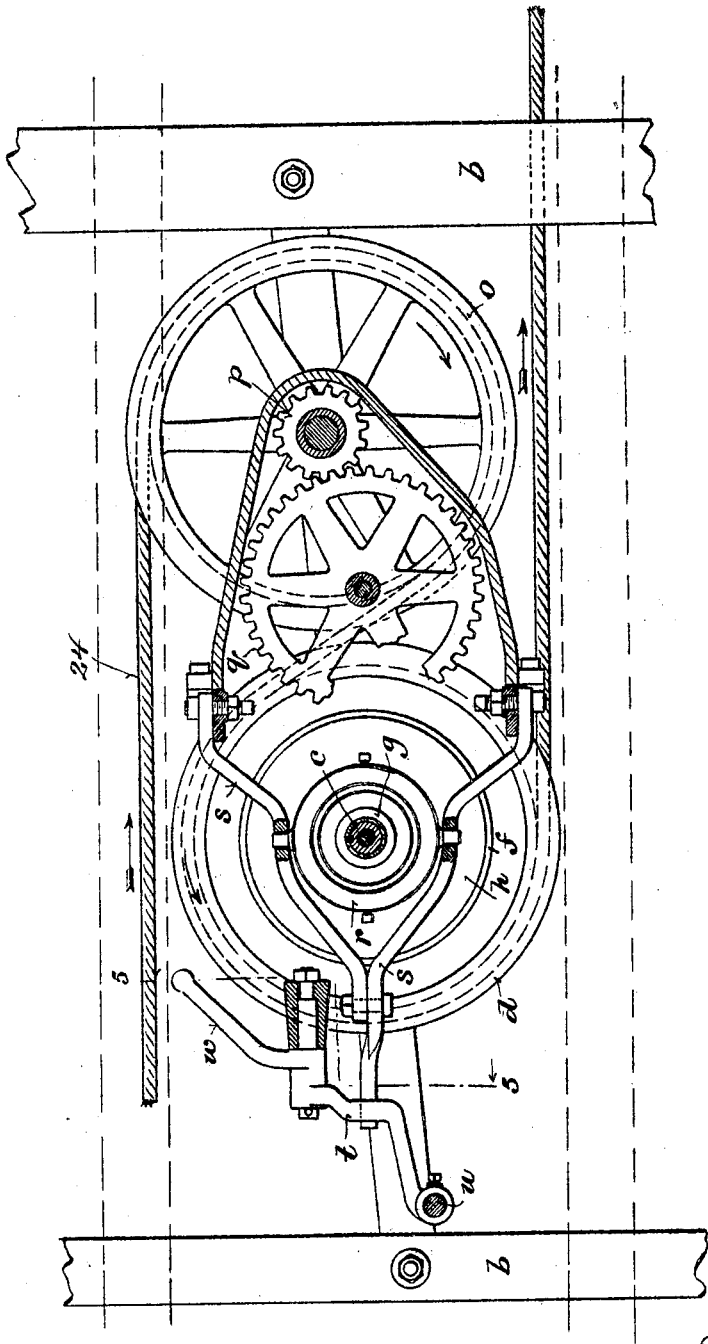

No. 798,234.  
PATENTED AUG. 29, 1905.
W. H. TROUT.  
SAWMILL SET WORKS.  
APPLICATION FILED DEC. 29, 1904.
6 SHEETS—SHEET 4.
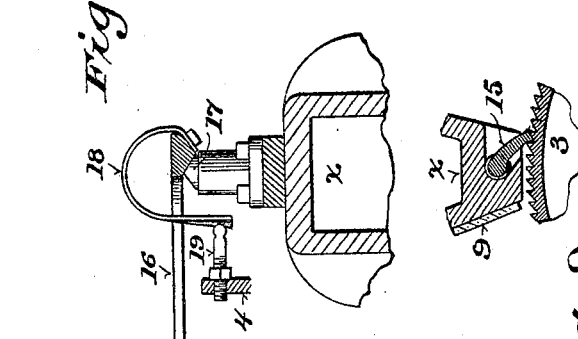
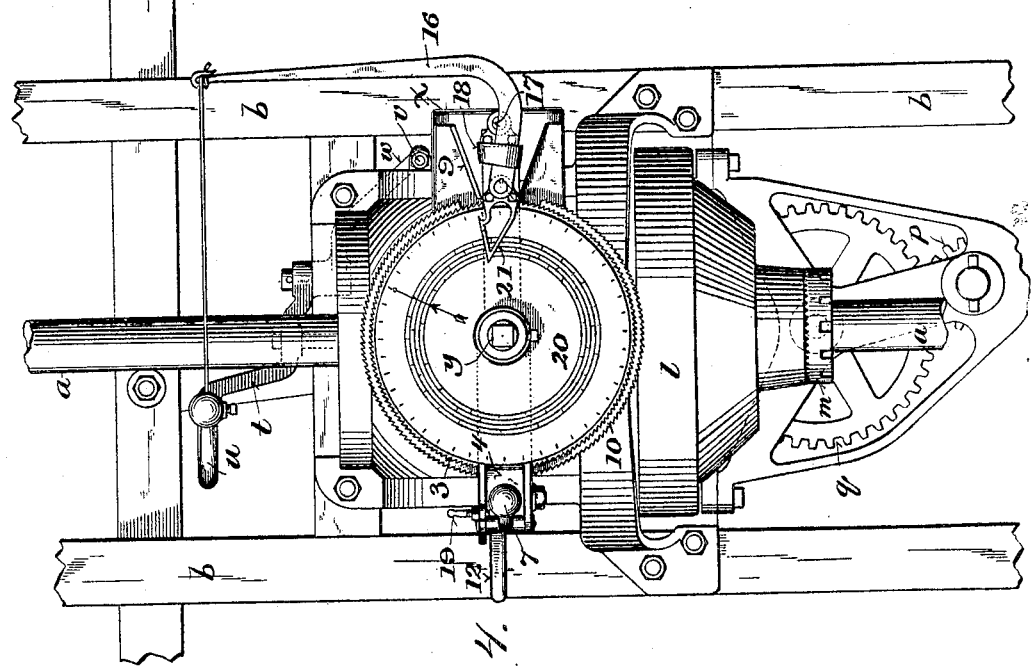
Witnesses  
Geo. W. Young.  
Chas. L. Goss.
Inventor:  
William H. Trout,  
By Winkler Flanders Smith Bottum Fawsett  
Attorneys.

No. 798,234. PATENTED AUG. 29, 1905.
W. H. TROUT.
SAWMILL SET WORKS.
APPLICATION FILED DEC. 29, 1904.

6 SHEETS—SHEET 5.

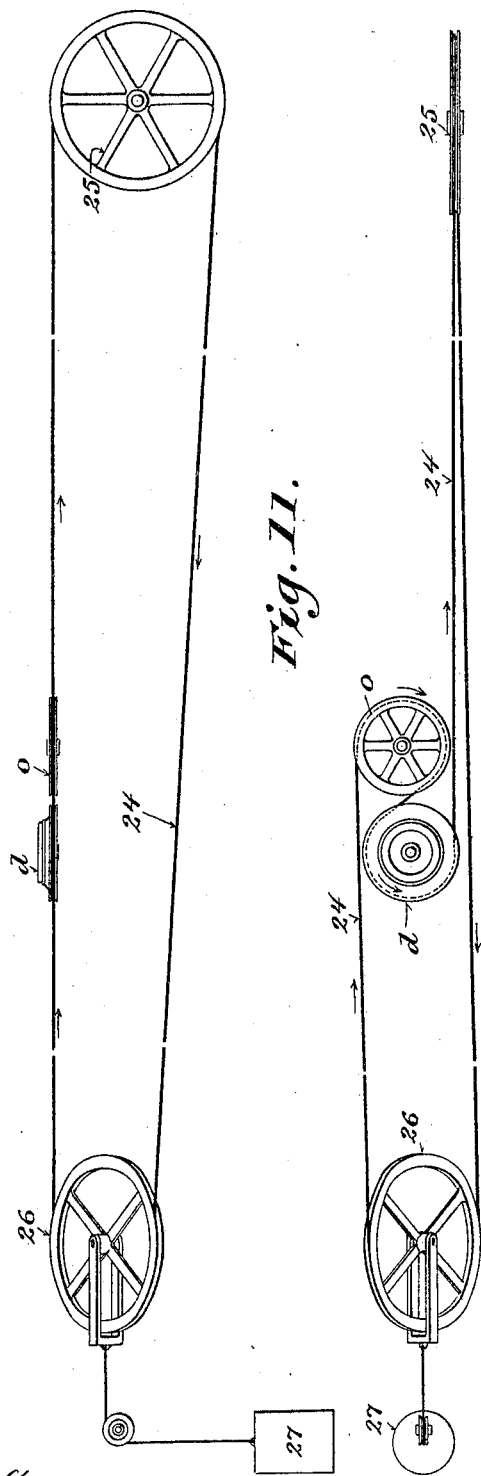

UNITED STATES PATENT OFFICE.

WILLIAM H. TROUT, OF MILWAUKEE, WISCONSIN.

SAWMILL SET-WORKS.

No. 798,234. Specification of Letters Patent. Patented Aug. 29, 1905.

Application filed December 29, 1904. Serial No. 238,720.

*To all whom it may concern:*

Be it known that I, WILLIAM H. TROUT, a citizen of the United States, residing at Milwaukee, in the county of Milwaukee and State of Wisconsin, have invented certain new and useful Improvements in Sawmill Set-Works, of which the following is a specification, reference being had to the accompanying drawings, forming a part thereof.

This invention relates to cable-driven set-works for sawmills; and its object is to simplify and improve the construction and operation of this class of set-works.

It consists in certain novel features of construction and in the peculiar arrangement and combinations of parts hereinafter particularly described, and pointed out in the claims.

In the accompanying drawings like characters designate the same parts in the several figures.

Figure 1:
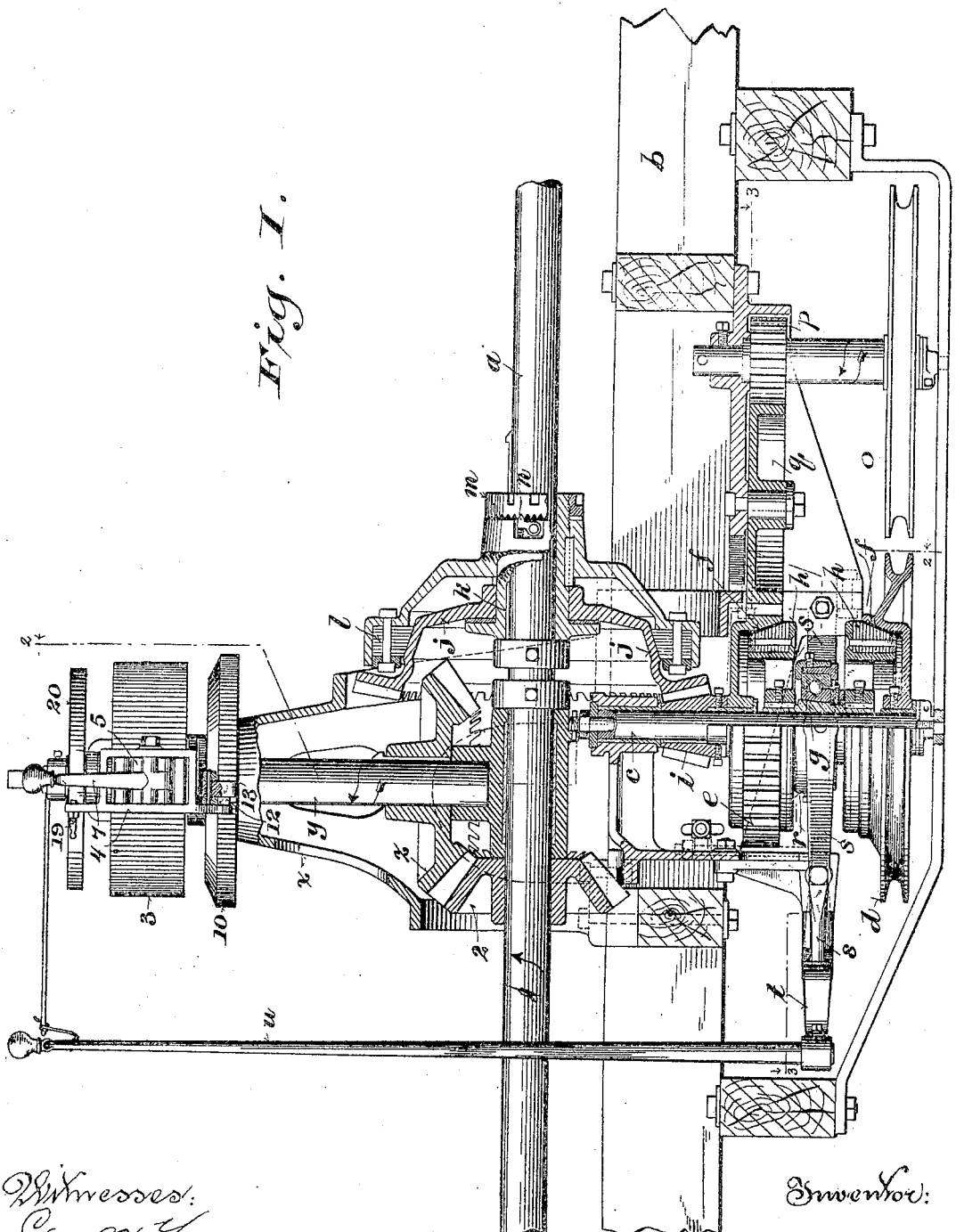
Figure 6:
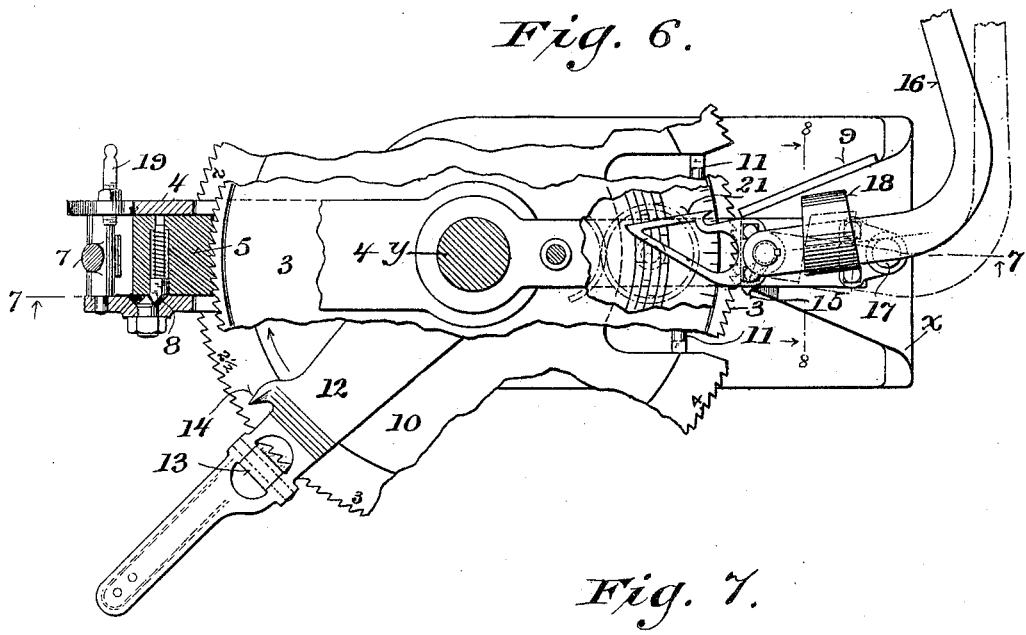
Figure 7:
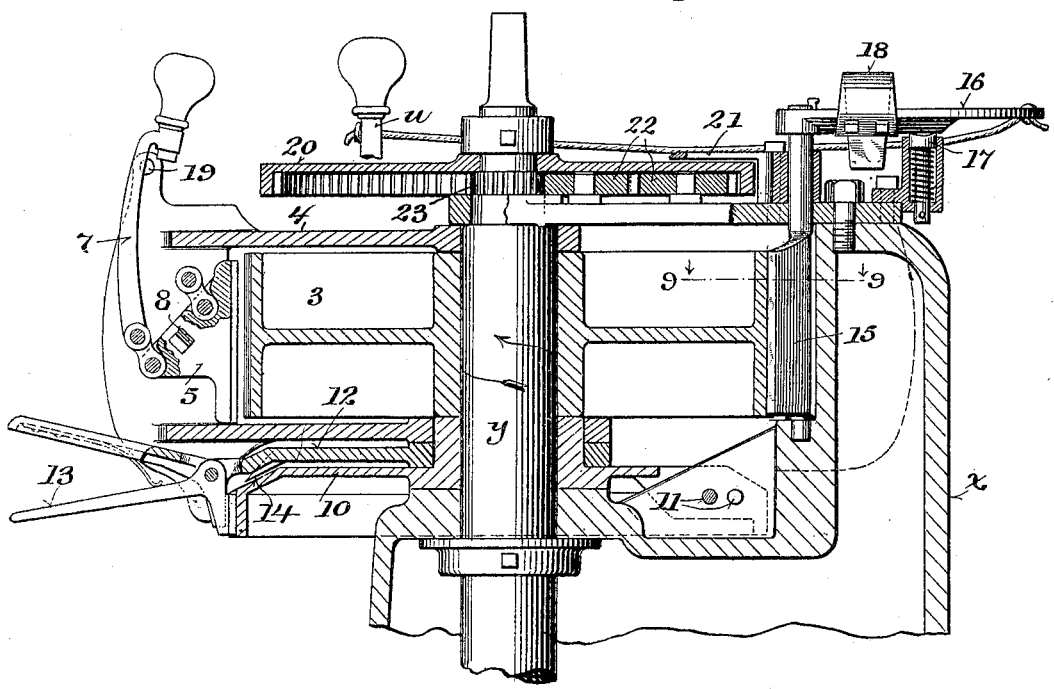

Figure 1 is a vertical longitudinal section and elevation (looking toward the saw-plane, of set-works embodying the invention. Fig. 2 is a vertical cross-section of the same on the line 2 2, Fig. 1. Fig. 3 is a horizontal section on the line 3 3, Fig. 1. Fig. 4 is a plan view. Fig. 5 is a vertical section on the line 5 5, Fig. 3, showing the operating-lever and the spring for returning it to and holding it in its normal position. Fig. 6 is a plan view, on an enlarged scale, of a portion of the gaging and stop mechanism. Fig. 7 is a vertical section on the line 7 7, Fig. 6. Fig. 8 is a vertical section on the line 8 8, Fig. 6, showing back-stop pawl and detent. Fig. 9 is a section on the line 9 9, Fig. 7, showing the back-stop pawl; and Figs. 10 and 11 are diagrams showing the arrangement of the driving-cable and sheaves, Fig. 10 being a plan view and Fig. 11 a side view.

The set-shaft $a$, mounted in the usual manner upon and lengthwise of the carriage $b$, is connected with the knees or standards by the usual or any suitable means, which are so well known and understood that it is not deemed necessary to illustrate or describe them.

Upon a vertical shaft $c$, arranged directly below the set-shaft $a$ in suitable bearings on the carriage, are loosely mounted a sheave $d$ and a gear $e$, each formed or provided with a beveled or conical friction-face or clutch member $f$. Between said sheave and gear a sleeve $g$ is splined or feathered on said shaft $c$ and is provided at the ends with paper or other suitable beveled or conical friction clutch members $h$, which are adjustably secured on said sleeve and adapted to engage one at a time with the opposing clutch members $f$ on the sheave $d$ and gear $e$.

A bevel-pinion $i$, fixed on the shaft $c$ above the gear $e$, meshes with a gear $j$, loosely mounted on a sleeve $k$, which is keyed or otherwise fixed on the set-shaft $a$. The gear $j$ is formed or provided with a conical or beveled friction-face or clutch member, which is engaged by a paper or other suitable clutch member $l$, feathered or splined on the sleeve $k$ and held in adjustable engagement with said gear by means of a collar $m$, which is threaded on the sleeve $k$ and locked in adjusted position thereon by a spring-actuated pawl $n$ engaging a toothed face of said collar. The parts last described constitute an adjustable friction driving connection between the set-shaft $a$ and the shaft $c$ and serve to prevent breaking the mechanism in case the operator fails to disconnect the setting or receding sheaves from the set-shaft at the proper time. The setting-sheave $o$, mounted on the carriage in the same horizontal plane with the receding sheave $d$, is fixed on one end of a vertical sleeve, to the other end of which a pinion $p$ is secured. This pinion is connected through an intermediate idle gear $q$ with the gear $e$. The sleeve connecting the sheave $o$ and pinion $p$ is revolubly mounted on a vertical shaft fixed to and carried by the carriage-frame.

An internally-grooved and adjustable fork-collar $r$ surrounds an externally-grooved collar on the sleeve $g$ and is connected therewith by interposed balls, as shown in Fig. 1. A fork-lever $s$, fulcrumed to a gear case or bracket depending from the carriage-frame, is pivotally connected with the collar $r$, on diametrically opposite sides thereof, and is engaged at its opposite end by the operating-lever $t$, which is fulcrumed to a depending bracket on the carriage. The lever $t$ is provided with a handle or arm $u$, extending upwardly therefrom into convenient reach of the setter or operator. A spring-actuated bolt $v$, movable vertically endwise through a bracket on the carriage-frame, presses normally at its lower end against an arm $w$ of the lever $t$ on the opposite side of its fulcrum from its operating handle or arm $u$, as shown in Figs. 2 and 5, and serves to hold said lever normally in its middle and neutral position, with the clutch members $h$ $h$ out of contact with the opposing clutch members $f\,f$, the weight of the lever $s$ and of the operating handle or arm $u$ of the lever $t$ holding the arm $w$ of said lever $t$ normally against the bolt $v$.

The stand $x$, mounted on the carriage-frame, carries a vertical shaft $y$, which is connected at its lower end by bevel-gears $z$ and 2 with the set-shaft. On the upper end of the shaft $y$ a ratchet or toothed wheel 3 is fixed, and a setting-arm 4 is pivoted above and below said ratchet-wheel to swing freely about its axis. This arm is provided, as shown in Figs. 6 and 7, with a toothed block or pawl 5, pivotally connected therewith by links, one of which is extended upwardly to form a lever 7 for moving said pawl into and out of engagement with the toothed periphery of said ratchet-wheel. The toothed block or pawl 5 is provided with a spring-actuated bolt 8, having a beveled nose projecting from one face thereof and adapted to engage with recesses in the adjacent face of the arm 4 for the purpose of holding said block or pawl in or out of engagement with the ratchet-wheel. The stand $x$ is provided, as shown in Figs. 4 and 6, with a stop 9, which is preferably faced with a cushion or pad of rubber or other suitable material for limiting the forward movement of the setting-arm and of the ratchet-wheel, to which said arm is locked. Below the ratchet-wheel a gage-plate 10 is pivotally mounted on said stand, so as to turn about the axis of the stop-shaft $y$, and is adjustably connected with said stand by screws 11, as shown in Figs. 6 and 7, for varying the angular position of said plate with relation to the stop 9. The periphery of said plate is formed with teeth corresponding with the teeth on the ratchet-wheel and is provided with a scale, as shown in Fig. 6, indicating the various dimensions of lumber to be cut. A gage-arm 12, pivotally mounted on the hub of the plate 10, so as to swing about the axis of the shaft $y$, is provided with a pivoted latch 13, adapted to be engaged with the toothed periphery of said plate and to lock said arm in any desired position thereon, as indicated by an index or pointer 14 on said arm and the scale on said plate.

A pawl 15, pivoted in the stand $x$ by engagement with the back of a tooth on the ratchet-wheel, as shown in Fig. 9, prevents recoil and backward movement of said wheel when the setting-arm 4 strikes the stop 9. To the upwardly-projecting pivot-pin of this pawl is fixed an angular or bent arm 16, which is connected by a cord, wire, or chain with the lever-arm $u$, as shown in Figs. 4 and 7. The arm 16 is beveled on the under side in opposite directions or made of V shape and engages the corresponding beveled or V-shaped upper end of a spring-actuated bolt 17, held in a vertical socket on the stand $x$, as shown in Figs. 2, 7, and 8. This bolt is so arranged that when it bears against one of the beveled faces on the under side of the arm 16 it will hold the pawl 15 in engagement with the ratchet-wheel, as shown in Figs. 4, 7, 8, and 9, and when it bears on the other beveled face of said arm it will hold said pawl out of engagement with the ratchet-wheel, as shown in Fig. 6. The arm 16 is provided with a spring 18 in the path of an adjustable stud 19 on the setting-arm 4 for shifting said arm 16 from the position in which it is shown by full lines in Fig. 6 to the position indicated by dotted lines and turning the pawl 15 into engagement with the ratchet-wheel just before the setting-arm 4 strikes the stop 9.

Loosely mounted on the shaft $y$ above the ratchet-wheel 3 is a dial 20, provided with a scale, indicating in connection with an index or pointer 21 on the stand $x$, as shown in Figs 4 and 6, the distance of the knees or standards from the plane of the saw. This dial is also provided with the usual lumber-scales and is turned by intermeshing gears 22, one of which meshes with a gear 23 on the shaft $y$ while the other meshes with the internally-toothed rim of said dial.

The set-shaft is turned and the knees or standards on the carriage are advanced or withdrawn on the head-blocks for setting and receding, as shown in Figs. 10 and 11 in connection with Fig. 3, by a constantly-driven endless cable 24, wrapped in opposite directions around the sheaves $d$ and $o$ on the carriage and passing thence in one direction from the sheave $d$ around the driving-sheave 25 and in the opposite direction from the sheave $o$ around the guiding-sheave 26. The driving-sheave 25 is mounted in a vertical plane at or near one end of the carriage-way, while the guiding-sheave 26 is mounted in an oblique or inclined plane at or near the opposite end of the carriage-way and is carried by a yoke or frame, which is movable toward and from the driving-sheave, and to which a weight 27 is attached for taking the slack out of the driving-cable and keeping it taut.

The set-works operates as follows: If, for example, a three-inch plank is to be cut, the gage-arm 12 is turned back to the point marked "3" on the gage-plate 10 and is then locked at that position by means of the latch 13, the exact position of said arm being indicated by the pointer 14. The setting-arm 4 is then turned back against the gage-arm 12 and is locked to the ratchet-wheel 3 by the toothed block or pawl 5, which is carried into engagement with the teeth of said wheel by throwing the lever 7 outward. The setter now pushes the arm $u$ of the operating-lever $t$ forward, thereby forcing the upper clutch member $h$ into engagement with the clutch member $f$ in the gear $e$ and locking said gear with the shaft $c$. Both the receding and setting sheaves $d$ and $o$ being constantly driven by the cable 24, the setting-sheave $o$ through the pinion $p$ and idle gear $q$ constantly turns said gear $e$, so that when said gear $e$ is locked with the shaft $c$ the set-shaft $a$ will be turned through the gear $j$, sleeve $k$, and friction clutch member $l$ in the required direction to advance the knees or standards. The set-shaft through the bevel-gears 2 and $z$ turns the stop-shaft $y$ and the ratchet-wheel 3, with the setting-arm 4 locked thereto, as above stated, until said arm strikes against the stop 9, and the further movement of the knees and setting mechanism is arrested in exactly the required position to cut a three-inch plank. The first tooth of the ratchet-wheel passing the pawl 15 turns the arm 16 till the apex of the double incline or V-shaped projection on the under side thereof passes over the apex of the bolt 17, which thereupon completes the movement of said arm into the position in which it is shown by full lines in Fig. 6. The nose of the pawl 15 is thus turned and held out of contact with the ratchet-wheel, while the ratchet-wheel is turned forward in setting up the knees on the carriage. Just before the setting-arm 4 strikes the stop 9 the stud 19 engages the spring 18 on the arm 16, and thereby turns said arm 16 back to the opposite side of the apex of the bolt 17, which throws the pawl 15 into engagement with the back of a tooth on the ratchet-wheel 3 just as said ratchet-wheel is brought to rest by the engagement of the arm 4 with the stop 9. In this way the pawl is brought into action only at the time it is required to prevent the recoil or backward movement of the ratchet-wheel, and the wear and noise which would otherwise result from the dragging of the pawl over the teeth of the ratchet-wheel are avoided. When the setting-arm 4 strikes the stop 9, the setter releases the lever-arm $u$, whereupon the sleeve $g$ automatically returns to its middle neutral position by reason of the unbalanced weight of the levers $s$ and $t$, thereby carrying the upper clutch member $h$ out of contact with the opposing clutch member $f$ in the gear $e$. If, however, he should fail to do this at the proper time, the gear $j$ will slip in the opposing clutch member $l$, or the clutch member $h$ will slip in the gear $e$, thereby preventing any injury to the mechanism. For different saw-kerfs or to slightly increase or diminish the dimensions of lumber indicated on the gage-plate 10 said plate may be adjusted about the axis of the stop-shaft $y$ by the proper manipulation of the screws 11. To withdraw the knees or standards after a log or piece of timber has been completely sawed or when it is desired to make a cut at a greater distance from the face of the knees or standards, the lever-arm $u$ is drawn back against the thrust of the spring-actuated bolt $v$, thereby carrying the lower clutch member $h$ into engagement with the sheave $d$. The set-shaft will then be turned backward and the knees receded through the direct connection of said sheave with the shaft $c$, the setting-sheave $o$ and the gears $e$, $q$, and $p$ turning idly. When the knees have reached the desired point in their backward movement, the operating lever-arm $u$ is released, and the spring-actuated bolt $v$, acting on the arm $w$ of lever $t$, returns the sleeve $g$ to its middle neutral position, thereby disengaging the lower clutch member $h$ from the opposing clutch member $f$ in the sheave $d$ and arresting further movement of the setting mechanism. The backward movement of the operating lever-arm $u$ through its flexible connection with the arm 16 automatically throws the pawl 15 out of contact with the ratchet-wheel 3, so that no attention is required on the part of the setter to said pawl in receding.

By the horizontal arrangement of the setting and receding sheaves on the carriage and the arrangement of the driving and guiding sheaves in the carriage-way, as hereinbefore explained, the connections between the set-shaft and the sheaves $d$ and $o$ are made more direct, while fewer sheaves are required and the driving-cable is less in the way of the mill operatives, the lower span of said cable being carried underneath and the upper span above and close to the floor of the mill.

It will be observed that the shaft $c$ is tubular and runs on a rod secured at the ends to a strut on the under side of the carriage-frame $b$ and to a box on the set-shaft $a$, which receive the end thrust of the clutch members $h$ against the opposing members $f$.

Various changes in the minor details of construction and arrangement of parts of the set-works may be made without materially affecting the principle and mode of operation of the machine and without departing from the spirit and scope of the invention.

I claim—

1. In sawmill set-works the combination with the set-shaft, of a vertical shaft geared therewith, a receding sheave and a gear loosely mounted on said vertical shaft and provided with clutch members, a sleeve splined on said vertical shaft between said sheave and gear and having clutch members movable therewith into and out of engagement with the clutch members on said sheave and gear, and a setting-sheave located in the same horizontal plane with the receding sheave and connected with said gear, substantially as described.

2. In sawmill set-works the combination with the set-shaft, of a vertical shaft having an adjustable friction driving connection with said set-shaft, and a sheave and gear loosely mounted thereon, a sleeve splined on said vertical shaft and having clutch members movable into and out of engagement with opposing clutch members on said sheave and gear, and a sheave connected with said gear, substantially as described.

3. In sawmill set-works, the combination with the set-shaft, of a vertical shaft connected therewith and having a gear and sheave revolubly mounted thereon and each provided with a friction clutch member, a sleeve splined on said vertical shaft and provided with friction clutch members adapted to be engaged with the opposing members on said sheave and gear, another sheave mounted in the same horizontal plane with the first-named sheave and connected with the gear on said vertical shaft, substantially as described.

4. In sawmill set-works the combination with the set-shaft, of a vertical shaft connected therewith and provided with a sheave and a gear loosely mounted thereon and with a sleeve splined thereon and carrying clutch members which are movable therewith from a middle neutral position into engagement either with said gear or with said sheave, means tending to return said sleeve into and to hold it in its middle position, a lever for moving said sleeve up and down from its middle position on said vertical shaft, and another sheave mounted in the same horizontal plane with said first-mentioned sheave and connected with said gear, substantially as described.

5. In sawmill set-works the combination with the carriage and set-shaft, of two sheaves mounted on the carriage in the same horizontal plane, means adapted to connect either of said sheaves with the set-shaft and to turn the same in opposite directions for setting and receding, driving and guiding sheaves arranged in the carriage-way, one in a vertical plane and the other in an oblique plane, and an endless driving-cable passing around said driving and guiding sheaves and in opposite directions around the setting and receding sheaves on the carriage, substantially as described.

6. In sawmill set-works the combination with the carriage and set-shaft, of two sheaves mounted on the carriage in the same horizontal plane, means for connecting either of said sheaves with the set-shaft to turn the same in opposite directions for setting and receding, driving and guiding sheaves arranged in the carriage-way, one in a vertical plane and the other in an oblique plane in positions to deliver the driving-cable to one of the sheaves on the carriage and to receive said cable from the other sheave on the carriage, the guiding-sheave being movable toward and from the driving-sheave, a weight connected with the guiding-sheave and tending to move it away from the driving-sheave and an endless driving-cable passing around said driving and guiding sheaves and in opposite directions around the sheaves on the carriage, substantially as described.

7. In sawmill set-works the combination with the set-shaft having a bevel-gear loosely mounted thereon, a friction clutch member splined on said shaft and held in adjustable engagement with said gear, a vertical shaft, a spur-gear and a sheave loosely mounted on said vertical shaft and provided with clutch members, connected clutch members splined on said vertical shaft between said spur-gear and sheave, a lever for moving said connected clutch members from their middle neutral position so as to carry either one of them into engagement with the opposing clutch member on said spur-gear or sheave, another sheave arranged in the same horizontal plane with the first-mentioned sheave and connected with the spur-gear on said vertical shaft, and a driving-cable arranged to turn said sheaves in opposite directions, substantially as described.

8. In sawmill set-works the combination with the set-shaft, of setting and receding members for turning said shaft in opposite directions, an operating-lever for connecting said shaft with either of said members, a stop-shaft geared with said set-shaft and having a ratchet-wheel fixed thereon, a setting-arm provided with means for locking it to said ratchet-wheel, stops for determining the movement of said arm, a pawl for preventing backward movement of the ratchet-wheel in setting, and a connection between said pawl and operating-lever adapted to throw the pawl out of engagement with the ratchet-wheel when said lever is carried into position to connect the set-shaft with the receding member, substantially as described.

9. In sawmill set-works the combination with the set-shaft and means for turning said shaft, of a shaft geared to said set-shaft and provided with a ratchet-wheel, a setting-arm provided with means for locking it to said ratchet-wheel, stops for determining and limiting the movement of said arm, a pawl for preventing backward movement of said ratchet-wheel in setting, and means for throwing and holding said pawl out of engagement with the ratchet-wheel after the first tooth of the ratchet-wheel in its advance passes the pawl, and for throwing said pawl into engagement with the ratchet-wheel as the setting-arm arrives at the front stop, substantially as described.

10. In sawmill set-works the combination with the set-shaft and means for turning said shaft, of a shaft geared to said set-shaft and provided with a ratchet-wheel, a setting-arm provided with means for locking it to said ratchet-wheel, a stop for limiting the advance of said arm, a pawl for preventing backward movement of the ratchet-wheel in setting, and a spring-actuated bolt engaging an arm on said pawl, one of said engaging parts having a double incline arranged to hold said pawl after it passes a central position either in or out of engagement with the ratchet-wheel, the passage of the first tooth of the ratchet-wheel in its advance carrying said pawl-arm past its central position in one direction, and the setting-arm upon its arrival at said stop, carrying said pawl-arm past its central position in the opposite direction, substantially as described.

In witness whereof I hereto affix my signature in presence of two witnesses.

WILLIAM H. TROUT.

Witnesses:
  CHAS. L. GOSS,
  ANNIE SEIDEL.